United States Patent
Ireland et al.

(10) Patent No.: US 9,469,783 B2
(45) Date of Patent: Oct. 18, 2016

(54) METHOD AND COMPOSITIONS THAT CAN BE USED FOR SEALING AND ASSEMBLING COMPONENTS OF A POWERTRAIN

(71) Applicant: BLUESTAR SILICONES FRANCE SAS, Lyons (FR)

(72) Inventors: Tania Ireland, Lyons (FR); Romain Sicre, Saint-Fons (FR)

(73) Assignee: BLUESTAR SILICONES FRANCE SAS, Lyons (FR)

( * ) Notice: Subject to any disclaimer, the term of this patent is extended or adjusted under 35 U.S.C. 154(b) by 0 days.

(21) Appl. No.: 14/653,514

(22) PCT Filed: Dec. 19, 2013

(86) PCT No.: PCT/FR2013/000356
§ 371 (c)(1),
(2) Date: Jun. 18, 2015

(87) PCT Pub. No.: WO2014/096573
PCT Pub. Date: Jun. 26, 2014

(65) Prior Publication Data
US 2015/0307743 A1    Oct. 29, 2015

(30) Foreign Application Priority Data
Dec. 20, 2012   (FR) ..................... 12 03539

(51) Int. Cl.
| | |
|---|---|
| *C08L 83/04* | (2006.01) |
| *C09D 183/06* | (2006.01) |
| *C08K 3/04* | (2006.01) |
| *C08G 77/18* | (2006.01) |
| *F16J 15/10* | (2006.01) |
| *C08K 5/31* | (2006.01) |
| *C08G 77/16* | (2006.01) |
| *C08K 5/544* | (2006.01) |
| *C08K 3/22* | (2006.01) |

(52) U.S. Cl.
CPC ............. *C09D 183/06* (2013.01); *C08G 77/18* (2013.01); *C08K 3/04* (2013.01); *C08K 3/22* (2013.01); *C08L 83/04* (2013.01); *F16J 15/102* (2013.01); *C08G 77/16* (2013.01); *C08K 5/31* (2013.01); *C08K 5/544* (2013.01); *C08K 2003/2203* (2013.01); *C08K 2003/2227* (2013.01)

(58) Field of Classification Search
CPC ....................................................... C08L 83/04
See application file for complete search history.

(56) References Cited

U.S. PATENT DOCUMENTS

| | | |
|---|---|---|
| 5,641,832 A | 6/1997 | Nagaoka |
| 2013/0102720 A1* | 4/2013 | Ireland .................... C08L 83/04 524/400 |

FOREIGN PATENT DOCUMENTS

| | | |
|---|---|---|
| EP | 2151480 A1 | 2/2010 |
| JP | 2009197188 A | 9/2009 |
| WO | 2011114021 A1 | 9/2011 |
| WO | 2013038076 A1 | 3/2013 |

OTHER PUBLICATIONS

International Search Report from corresponding PCT/FR2013/000356, mailed Feb. 13, 2014.

\* cited by examiner

*Primary Examiner* — Robert Harlan
(74) *Attorney, Agent, or Firm* — McBee Moore Woodward Vanik IP LLC

(57) ABSTRACT

The present invention concerns a crosslinkable silicone elastomer composition and a method using the composition according to the invention for forming sealing gaskets and assembly seals for the components of a powertrain. The silicone elastomers prepared from the composition according to the invention have:—good mechanical strength properties such as shore hardness, breaking strength, modulus at 100% elongation and—good resistance to ageing in chemically aggressive fluids such as those used, for example, in a powertrain, in this case engine oils, lubricants for the gearbox and axle, oil/petrol mixtures, coolant liquids, fuels or antifreeze liquids, and—good adhesion properties even on surfaces polluted by oils used in a powertrain.

13 Claims, No Drawings

METHOD AND COMPOSITIONS THAT CAN BE USED FOR SEALING AND ASSEMBLING COMPONENTS OF A POWERTRAIN

CROSS REFERENCE TO RELATED APPLICATIONS

This application is a §371 National Stage Application of PCT/FR2013/000356, filed 19 Dec. 2013, which claims priority to FR 1203539, filed 20 Dec. 2012.

BACKGROUND

1. Field of the Invention

The present invention relates to a silicone composition that can be crosslinked into elastomer and to a process using the composition according to the invention for forming seals for leakproofing and for assembling the components of a powertrain. Silicone elastomers prepared from the composition according to the invention have:

- good mechanical strength properties such as the shore hardness, the breaking strength, the modulus at 100% elongation, and
- good resistance to aging in chemically corrosive fluids such as those used, for example, in a powertrain, namely engine oils, gearbox and powered axle lubricants, oil/fuel mixtures, cooling liquids, fuels or antifreeze liquids, and
- good properties of adhesion even to surfaces polluted with oils used in a powertrain.

2. Description of Related Art

The term "cooling liquid" means any heat-exchange liquid used for evacuating heat from a mechanical or electronic system.

Silicone compositions that can be crosslinked into elastomer to form leakproofing seals are known. Specifically, they are suitable in particular for forming in-situ leakproofing seals, which are formed directly during the assembly of the elements, in particular in the motor vehicle sector.

Among the silicone compositions that can be crosslinked into elastomer which are known for this type of application, those that crosslink at room temperature form a category that is particularly appealing since they do not require the installation of an energy-consuming oven.

These silicone compositions are classified into two different groups: one-pack compositions (RTV-1) and two-pack compositions (RTV-2). The term "RTV" is the abbreviation for "room-temperature vulcanizing".

During crosslinking, water (either provided by atmospheric moisture in the case of RTV-1 compositions, or introduced into one part of the composition in the case of RTV-2 compositions) enables the polycondensation reaction, which results in the formation of the elastomeric network.

Generally, one-pack compositions (RTV-1) crosslink when they are exposed to atmospheric moisture. Usually, the polycondensation reaction kinetics are extremely slow; these reactions are thus catalyzed with a suitable catalyst.

Furthermore, in the face of a transport industry that is undergoing great changes, new constraints are arising linked to increasing engine yields, increasing operating temperatures, reducing fuel consumption and reducing the frequency of maintenance.

Thus, formulators of powertrain fluids (engine oil, gearbox and powered axle lubricant, oil/fuel mixture, cooling liquid, fuel or antifreeze liquid) continue to improve the performance qualities of these products by adding increasingly efficient additives. The amount of additives incorporated into these products is incessantly increasing, which has the effect of increasing their chemical corrosiveness toward the flexible members, for example leakproofing seals, present in the devices in which these products are used.

Patent application JP-A-2009/197188 describes silicone compositions which have good resistance on contact with the various fluids used in a powertrain, but these compositions comprise complex and expensive crosslinkable oils which contain a C1 to C5 alkylene joint represented by the symbol Y in the following formulae:

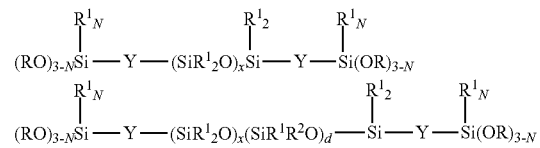

Patent application EP 2 151 480 describes silicone compositions which have good resistance on contact with the various fluids used in a powertrain, but these compositions comprise, inter alia, a surface-treated calcium carbonate.

Patent application PCT/FR 2012/000 364 describes silicone compositions which have good resistance on contact with the various fluids used in a powertrain, but these compositions comprise an amount strictly greater than 35% by weight, relative to the total amount of the composition, of at least one ground natural calcium carbonate with a specific surface area strictly less than 3 m²/g, measured according to the BET method, and which has been surface-treated with at least one compound chosen from the group consisting of a paraffin, a fatty acid, a fatty acid salt, and a mixture thereof.

U.S. Pat. No. 5,641,832 describes silicone compositions which have good resistance on contact with the various fluids used in a powertrain, but these compositions comprise a filler prepared by impregnation of a porous filler with a volatile organic compound that is incompatible or partially incompatible with the polyorganosiloxane used.

Patent application WO 2011/114 021 describes silicone compositions which have good resistance on contact with the various fluids used in a powertrain, but these compositions comprise at least one siloxane which is a condensate obtained by partial hydrolysis and condensation of a polyalkoxylated silane, said siloxane containing from 2 to 10 identical or different siloxyl units, of formula:

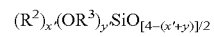

in which:
x'=0, 1, 2 or 3; y'=0, 1, 2 or 3, x'+y'=0, 1, 2 or 3,
the symbol $R^2$ represents a $C_1$ to $C_{13}$ monovalent hydrocarbon-based radical, and
the symbol $R^2$ represents a $C_1$ to $C_6$ monovalent hydrocarbon-based radical or an alkoxyalkyl radical optionally comprising an ester function, and
with the condition that for at least one siloxyl unit, the index y' is ≥1.

These compositions have the drawbacks of leading, after their aging, to elastomers whose mechanical properties and properties of resistance to engine oils and adhesion to a polluted surface are degraded.

There is thus an increasing need to find novel silicone compositions that are useful for forming seals for leakproofing and for assembling the components of a powertrain, even on surfaces polluted with oils, and even after aging of these novel compositions.

SUMMARY

Thus, one of the essential objectives of the present invention is to propose novel organopolysiloxane compositions that cure to a silicone elastomer in the presence of water or moisture, which are useful for sealing and assembling the elements of a powertrain.

Another objective is to propose a novel process for sealing and assembling components of a powertrain by means of silicone seals that have good resistance on contact with the various fluids used in a powertrain, while at the same time having good adhesion properties on a polluted surface, even after aging of these novel compositions.

These objectives, among others, are achieved by the present invention, which concerns a polyorganosiloxane composition X that is crosslinkable into elastomer in the presence of moisture provided by the ambient air or by prior addition of water, via polycondensation reactions comprising:

A) at least one polyorganosiloxane A comprising at least one alkoxylated group and consisting of identical or different siloxyl units, of formula:

$$(Z)_b(R^4)_a SiO_{[4-(a+b)]/2} \quad (1)$$

in which:
the symbol $Z=[-(OCH_2CH_2)_c-OR^5]$, with c=0 or 1,
a=0, 1, 2 or 3; b=0, 1, 2 or 3, a+b=0, 1, 2 or 3,
the symbol $R^4$ represents a $C_1$ to $C_{13}$ monovalent hydrocarbon-based radical,
the symbol $R^5$ represents a $C_1$ to $C_6$ monovalent hydrocarbon-based radical or an alkoxyalkyl radical optionally comprising an ester function, and
with the condition that for at least one siloxyl unit, the index b≥1 such that the polyorganosiloxane A contains at least one alkoxylated group Z, B) optionally at least one polyalkoxylated silane B of formula:

$$(R^2)_z Si(OR^3)_{(4-z)} \quad (2)$$

in which:
z=0 or 1,
the symbol $R^2$ represents a $C_1$ to $C_{13}$ monovalent hydrocarbon-based radical, and
the symbols $R^3$, which may be identical or different, each represent a $C_1$ to $C_6$ monovalent hydrocarbon-based radical or an alkoxyalkyl radical optionally containing an ester function, C) at least one acetylene black D whose function is to absorb an oil used in a powertrain,
D) at least one aluminum trihydrate E as mineral filler,
E) at least one adhesion promoter F bearing at least one amine function,
F) a catalytically effective amount of at least one guanidine G as condensation catalyst,
G) optionally at least one unreactive linear polyorganosiloxane H, this reagent possibly acting on the physical characteristics of the compositions in accordance with the invention and/or on the mechanical properties of the elastomers resulting from the curing of these compositions,
H) optionally at least one filler I, different from E, and
I) optionally at least one additive J such as a coloring base, a pigment or a thixotropic agent,
with the additional conditions that
said polyorganosiloxane composition X contains neither any calcium carbonate nor any siloxane containing from 2 to 10 siloxyl units obtained by partial hydrolysis and condensation of a polyalkoxylated silane, and that
the polyorganosiloxane A has a number of units strictly greater than 10, preferably greater than 20 and at most equal to 2000.

To achieve this objective, the Applicant has, to its credit, demonstrated, entirely surprisingly and unexpectedly, that the use of at least one acetylene black D whose function is to adsorb an oil used in a powertrain in combination with at least one aluminum trihydrate E as mineral filler and at least one adhesion promoter F bearing at least one amine function, makes it possible to prepare seals for sealing and assembling components or elements used in a powertrain, even with alkoxylated polyorganosiloxanes not containing any alkyl joints as described in patent application JP-A-2009/197 188 and even in the absence of calcium carbonate or of siloxane that is a condensate obtained by partial hydrolysis and condensation of a polyalkoxylated silane, as described in patent applications PCT/FR2012/000364 and WO2011/114021.

Furthermore, the silicone elastomers prepared from the composition according to the invention have the advantage of maintaining good mechanical properties even when they are in prolonged contact with chemically corrosive fluids such as those used, for example, in a powertrain, even after aging of the composition.

As examples of chemically corrosive fluids, mention may be made of engine oils, gearbox and powered axle lubricants, oil/fuel mixtures, cooling liquids, fuels and antifreeze liquids.

DETAILED DESCRIPTION OF A PREFERRED EMBODIMENT

Preferably, the polyorganosiloxane composition X comprises:

A) at least one polyorganosiloxane A comprising at least one alkoxylated group and consisting of identical or different siloxyl units, of formula:

$$(Z)_b(R^4)_a SiO_{[4-(a+b)]/2} \quad (1)$$

in which:
a. the symbol $Z=[-(OCH_2CH_2)_c-OR^5]$, with c=0 or 1,
b. a=0, 1, 2 or 3; b=0, 1, 2 or 3, a+b=0, 1, 2 or 3,
c. the symbol $R^4$ represents a $C_1$ to $C_{13}$ monovalent hydrocarbon-based radical,
d. the symbol $R^5$ represents a $C_1$ to $C_6$ monovalent hydrocarbon-based radical or an alkoxyalkyl radical optionally comprising an ester function, and
e. with the condition that for at least one siloxyl unit, the index b≥1 such that the polyorganosiloxane A contains at least one alkoxylated group Z, B) at least one polyalkoxylated silane B of formula:

$$(R^2)_z Si(OR^3)_{(4-z)} \quad (2)$$

in which:
z=0 or 1,
the symbol $R^2$ represents a $C_1$ to $C_{13}$ monovalent hydrocarbon-based radical, and
the symbols $R^3$, which may be identical or different, each represent a $C_1$ to $C_6$ monovalent hydrocarbon-based radical or an alkoxyalkyl radical optionally containing an ester function, C) at least one acetylene black D whose function is to absorb an oil used in a powertrain, D) at least one aluminum trihydrate E as mineral filler,
E) at least one adhesion promoter F bearing at least one amine function,
F) a catalytically effective amount of at least one guanidine G as condensation catalyst,
G) optionally at least one unreactive linear polyorganosiloxane H, this reagent possibly acting on the physical characteristics of the compositions in accordance with the invention and/or on the mechanical properties of the elastomers resulting from the curing of these compositions,
H) optionally at least one filler I, different from E, and
I) optionally at least one additive J such as a coloring base, a pigment or a thixotropic agent,
with the additional conditions that
said polyorganosiloxane composition X contains neither any calcium carbonate nor any siloxane containing from 2 to 10 siloxyl units obtained by partial hydrolysis and condensation of a polyalkoxylated silane, and that
the polyorganosiloxane A has a number of units strictly greater than 10, preferably greater than 20 and at most equal to 2000.

Preferably, the polyorganosiloxane composition X is in the form of an RTV-1 one-pack composition, i.e. in a single airtight package.

Preferably, the crosslinkable polyorganosiloxane A is linear and has the structural formula:

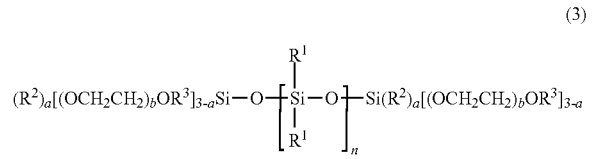

(3)

in which:
the substituents R1, which may be identical or different, each represent a substituted or unsubstituted aliphatic, cyclanic or aromatic $C_1$ to $C_{13}$ saturated or unsaturated monovalent hydrocarbon-based radical;
the substituents R2, which may be identical or different, each represent a substituted or unsubstituted aliphatic, cyclanic or aromatic $C_1$ to $C_{13}$ saturated or unsaturated monovalent hydrocarbon-based radical;
the substituents R3, which may be identical or different, each represent a linear or branched $C_1$ to $C_6$ alkyl radical;
n has a value sufficient to give the polyorganopolysiloxane of formula A a dynamic viscosity at 25° C. ranging from 1000 to 1 000 000 mPa·s; and
the index a is equal to zero or 1 and the index b is equal to zero or 1.

According to another preferred embodiment, the polyorganosiloxane A comprising at least one alkoxylated group is obtained by reacting, optionally in situ, in the presence of a catalytically effective amount of at least one functionalization catalyst C:
a) at least one polyorganosiloxane A' comprising siloxyl units of formula:

$(R^1)_x(OH)_y SiO_{(4-x-y)/2}$ (4)

in which:
x=0, 1, 2 or 3; y=0, 1, 2 or 3, x+y=0, 1, 2 or 3;
the substituents $R^1$, which may be identical or different, each represent a $C_1$ to $C_{30}$ monovalent hydrocarbon-based radical chosen from the group consisting of alkyl, cycloalkyl, aryl; alkaryl and aralkyl radicals, and
at least two siloxyl units comprising a group ≡SiOH are present in the polyorganosiloxane A', with
b) at least one polyalkoxylated silane B of formula:

$(R^2)_z Si(OR^3)_{(4-z)}$ (2)

in which:
z=0 or 1,
the symbol $R^2$ represents a $C_1$ to $C_{13}$ monovalent hydrocarbon-based radical, and
the symbols $R^3$, which may be identical or different, each represent a $C_1$ to $C_6$ monovalent hydrocarbon-based radical or an alkoxyalkyl radical optionally containing an ester function.

According to another preferred embodiment, the polyorganosiloxane A' is preferably an α,ω-dihydroxypolydiorganosiloxane polymer, with a viscosity of between 1000 and 1 000 000 mPa·s at 25° C.

The polyalkoxylated silanes B are products that are available on the silicones market; furthermore, their use in room-temperature curing compositions is known; it is featured especially in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

As examples of polyalkoxylated silanes B, mention may be made of those of formula:
$Si(OCH_3)_4$
$Si(OCH_2CH_3)_4$
$Si(OCH_2CH_2CH_3)_4$
$(CH_3O)_3 SiCH_3$
$(C_2H_5O)_3 SiCH_3$
$(CH_3O)_3 Si(CH=CH_2)$
$(C_2H_5O)_3 Si(CH=CH_2)$
$(CH_3O)_3 Si(CH_2-CH=CH_2)$
$(CH_3O)_3 Si[CH_2-(CH_3)C=CH_2]$
$(C_2H_5O)_3 Si(OCH_3)$
$Si(OCH_2-CH_2-OCH_3)_4$
$CH_3 Si(OCH_2-CH_2-OCH_3)_3$
$(CH_2=CH)Si(OCH_2CH_2OCH_3)_3$
$C_6H_5 Si(OCH_3)_3$
$C_6H_5 Si(OCH_2-CH_2-OCH_3)_3$.

The preparation of polyorganosiloxanes comprising alkoxylated groups by functionalization is described, for example, in French patent application FR 2 638 752-A1.

Preferably, the functionalization catalyst C is lithium hydroxide or potassium hydroxide.

Lithium hydroxide is widely used commercially. Preferably, it is used as a solution in an alcohol, for instance methanol or ethanol.

The introduction of at least one acetylene black D has the function of absorbing an oil used in a powertrain. It is obtained by thermal cracking of acetylene and is in powder form. Thus, these acetylene blacks have a lower specific surface area than that of the active charcoals generally used as catalyst support. This specific surface area is generally between 50 and 100 m²/g. These acetylene blacks are also distinguished by other technical characteristics such as their crystal structure, their oxidation state, a high chemical purity and great porosity. By way of example, as acetylene blacks that are suitable for use in the invention, mention may be made of the blacks sold by the company SN2A, under the trade names Y70, Y200, Y50, YS. To facilitate their incorporation, these acetylene blacks may be introduced in the form of a paste, i.e. as a mixture with at least one polyorganosiloxane oil.

The purpose of introducing at least one aluminum trihydrate E, which may have been surface-modified, is to give good mechanical and rheological properties to the elastomers that result from the curing of the compositions in accordance with the invention. Aluminum trihydrates are also known as alumina hydrate, aluminum trihydroxide, ATH, aluminum hydrate and aluminum hydroxide. The representation $Al(OH)_3$, consisting of an $Al^{3+}$ ion linked to three $OH^-$ ions is very simplified, and the compound is generally more or less hydrated. A more rigorous representation would thus be $Al_2O_3.xH_2O$ for the three oxides/hydroxides. Certain silanes commonly used in the treatment of ATH are described in patents U.S. Pat. Nos. 4,526,922 and 4,550,056.

The composition according to the invention may comprise at least one adhesion promoter F bearing at least one amine function, for instance:

[H$_2$N(CH$_2$)$_3$]Si(OCH$_2$CH$_2$CH$_3$)$_3$,
[H$_2$N(CH$_2$)$_3$]Si(OCH$_3$)$_3$
[H$_2$N(CH$_2$)$_3$]Si(OC$_2$H$_5$)$_3$
[H$_2$N(CH$_2$)$_4$]Si(OCH$_3$)$_3$
[H$_2$NCH$_2$CH(CH$_3$)CH$_2$CH$_2$]SiCH$_3$(OCH$_3$)$_2$
[H$_2$NCH$_2$]Si(OCH$_3$)$_3$
[n-C$_4$H$_9$—HN—CH$_2$]Si(OCH$_3$)$_3$
[H$_2$N(CH$_2$)$_2$NH(CH$_2$)$_3$]Si(OCH$_3$)$_3$
[H$_2$N(CH$_2$)$_2$NH(CH$_2$)$_3$]Si(OCH$_2$CH$_2$OCH$_3$)$_3$
[CH$_3$NH(CH$_2$)$_2$NH(CH$_2$)$_3$]Si(OCH$_3$)$_3$
[H(NHCH$_2$CH$_2$)$_2$NH(CH$_2$)$_3$]Si(OCH$_3$)$_3$
HS(CH$_2$)$_3$Si(OCH$_3$)$_3$
NH2CONH2(CH$_2$)$_3$Si(OCH$_3$)$_3$

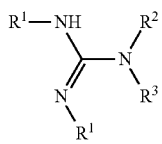

or polyorganosiloxane oligomers containing such organic groups in a content greater than 20%.

According to a preferred embodiment, the condensation catalyst G is a guanidine corresponding to the general formula (I):

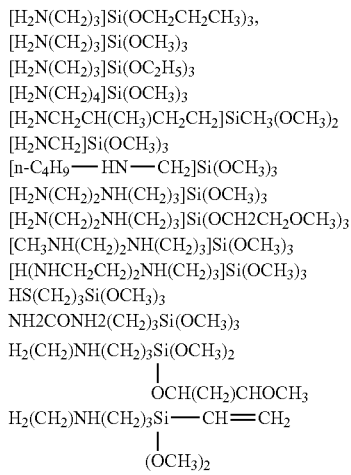

(I)

in which:
the radicals $R^1$, which may be identical or different, represent, independently of each other, a linear or branched monovalent alkyl group, a cycloalkyl group, a (cycloalkyl)alkyl group, the ring being optionally substituted and possibly comprising at least one heteroatom or a fluoroalkyl group,
the radical $R^2$ represents a hydrogen atom, a linear or branched monovalent alkyl group, a cycloalkyl group, an alkyl group substituted with a ring that is optionally substituted and that possibly comprises at least one heteroatom, an aromatic group, an arylalkyl group, a fluoroalkyl group, an alkylamine group or an alkylguanidine group, and
the radical $R^3$ represents a linear or branched monovalent alkyl group, a cycloalkyl group, an alkyl group substituted with a ring that is optionally substituted and that possibly comprises at least one heteroatom or an arylalkyl, fluoroalkyl, alkylamine or alkylguanidine group,
when the radical $R^2$ is not a hydrogen atom, the radicals $R^2$ and $R^3$ may be linked to form a 3-, 4-, 5-, 6- or 7-membered aliphatic ring optionally substituted with one or more substituents.

These are 1,2,3-trisubstituted and 1,2,3,3-tetrasubstituted guanidines and have the advantage of being liquid, colorless, odorless and soluble in silicone matrices. Examples of catalysts of this type are described in international patent application WO 2009/118 307.

Use will preferably be made of the catalysts (A1) to (A6) below:

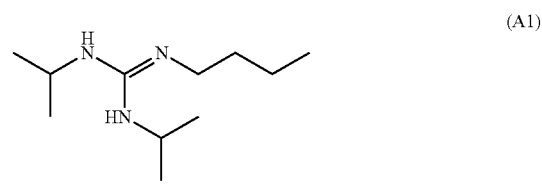

(A1)

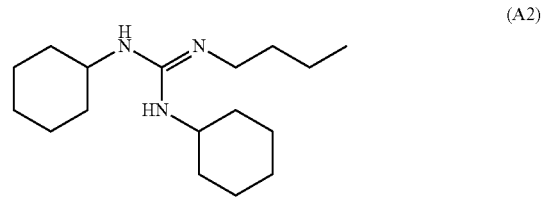

(A2)

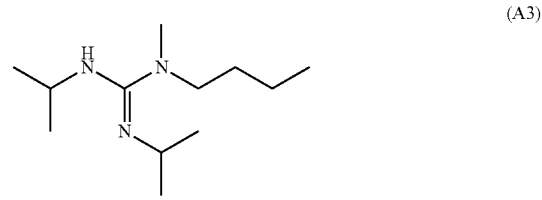

(A3)

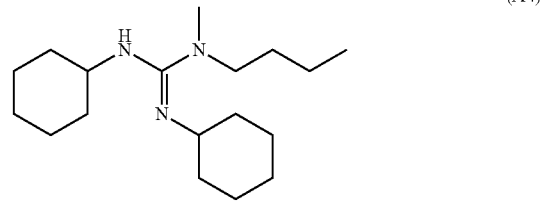

(A4)

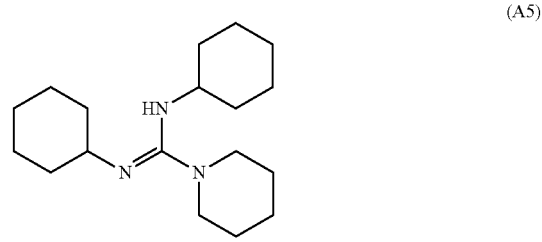

(A5)

(A6)

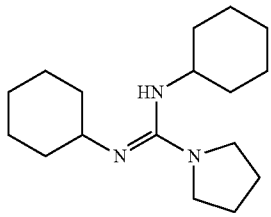

According to another preferred embodiment, the condensation catalyst G is a guanidine of formula:

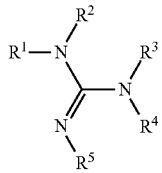

(II)

in which:
the radicals R¹, R², R³, R⁴ or R⁵, which may be identical or different, represent, independently of each other, a linear or branched monovalent alkyl group, a cycloalkyl group, a (cycloalkyl)alkyl group, the ring being optionally substituted and possibly comprising at least one heteroatom or a fluoroalkyl group, an aromatic group, an arylalkyl group, a fluoroalkyl group, an alkylamino group or an alkylguanidine group, and the radicals R¹, R², R³ or R⁴ may be linked in pairs so as to form a 3-, 4-, 5-, 6- or 7-membered aliphatic ring optionally substituted with one or more substituents.

These are pentasubstituted guanidines and have the advantage of being liquid, colorless, odorless and soluble in silicone matrices.

According to a particular embodiment, compounds (A7) to (A9) below are preferred:

(A7)

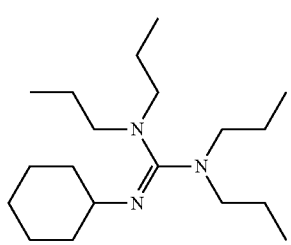

(A8)

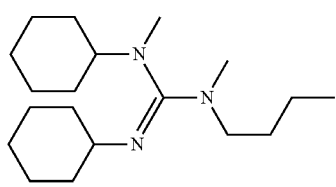

(A9)

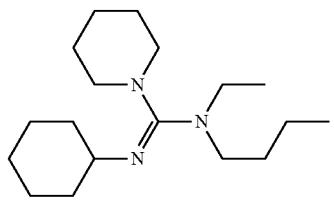

They are described, for example, in French patent application FR-08/06610 filed on Nov. 25, 2008.

Nonreactive linear polyorganosiloxane (H) may be introduced with the intention of acting on the physical characteristics of the compositions in accordance with the invention and/or on the mechanical properties of the elastomers resulting from the curing of these compositions.

These nonreactive linear polyorganosiloxane polymers (H) are well known; they comprise more especially: α,ω-bis(triorganosiloxy)diorganopolysiloxane polymers with viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more precisely in French patents FR-A-978 058, FR-A-1 025 150, FR-A-1 108 764 and FR-A-1 370 884. α,ω-Bis(trimethylsiloxy)dimethylpolysiloxane oils with a viscosity ranging from 10 mPa·s to 1000 mPa·s at 25° C. are preferably used. These polymers act as plasticizers.

The purpose of introducing at least one filler I, different from E, is to give good mechanical and rheological properties to the elastomers that result from the curing of the compositions in accordance with the invention.

Very finely divided mineral fillers, the mean particle diameter of which is less than 0.1 μm, are used, for example. Among these fillers are fumed silicas and precipitated silicas; their BET specific surface area is generally greater than 40 m²/g. These fillers may also be in the form of more coarsely divided products with an average particle diameter greater than 0.1 μm. As examples of such fillers, mention may be made of ground quartz, diatomaceous silicas, calcined clay, rutile-type titanium oxide, iron, zinc, chromium, zirconium or magnesium oxides, boron nitride, lithopone, barium metaborate, barium sulfate, kaolin and glass microbeads; their specific surface area is generally less than 30 m²/g.

These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3 to 30% of their weight of organosilicon compounds. The fillers may be constituted of a mixture of several types of fillers of different particle size; thus, for example, they may be constituted of 30 to 70% of finely divided silicas with a BET specific surface area greater than 40 m²/g and of 70 to 30% of more coarsely divided silicas with a specific surface area less than 30 m²/g. These fillers may be surface-treated.

Preferably, the filler I is present and is preferably a kaolin.

According to a preferred embodiment, the polyorganosiloxane composition X according to any one of the preceding claims comprises:

A) per 100 parts by weight of at least one polyorganosiloxane A comprising at least one alkoxylated group and consisting of identical or different siloxyl units, of formula:

$$(Z)_b(R^4)_a SiO_{[4-(a+b)]/2} \quad (1)$$

in which:
the symbol $Z=[-(OCH_2CH_2)_c-OR^5]$, with $c=0$ or 1,
$a=0, 1, 2$ or 3; $b=0, 1, 2$ or 3, $a+b=0, 1, 2$ or 3,
the symbol $R^4$ represents a $C_1$ to $C_{13}$ monovalent hydrocarbon-based radical,
the symbol $R^5$ represents a $C_1$ to $C_6$ monovalent hydrocarbon-based radical or an alkoxyalkyl radical optionally comprising an ester function, and
with the condition that for at least one siloxyl unit, the index b is $\geq 1$ such that the polyorganosiloxane A contains at least one alkoxylated group Z, B) from 0 to 50 parts by weight and preferably from 0.01 to 50 parts by weight of at least one polyalkoxylated silane B of formula $$(R^2)_z Si(OR^3)_{(4-z)} \quad (2)$$

in which:
$z=0$ or 1,
the symbol $R^2$ represents a $C_1$ to $C_{13}$ monovalent hydrocarbon-based radical, and
the symbols $R^3$, which may be identical or different, each represent a $C_1$ to $C_6$ monovalent hydrocarbon-based radical or an alkoxyalkyl radical optionally containing an ester function, C) from 0.01 to 50 parts by weight of at least one acetylene black D whose function is to absorb an oil used in a powertrain, D) from 0.1 to 50 parts by weight of at least one aluminum trihydrate E as mineral filler, E) from 0.1 to 60 parts by weight of at least one adhesion promoter F bearing at least one amine function, F) from 0.01 to 50 parts by weight of at least one guanidine G as condensation catalyst, G) from 0 to 60 parts by weight of at least one unreactive linear polyorganosiloxane H, this reagent possibly acting on the physical characteristics of the compositions in accordance with the invention and/or on the mechanical properties of the elastomers resulting from the curing of these compositions, H) from 0 to 250 parts by weight of at least one filler I, different from E, and I) from 0 to 20 parts by weight of at least one additive J such as a coloring base, a pigment or a thixotropic agent, with the additional conditions that
said polyorganosiloxane composition X contains neither any calcium carbonate nor any siloxane containing from 2 to 10 siloxyl units obtained by partial hydrolysis and condensation of a polyalkoxylated silane, and that
the polyorganosiloxane A has a number of units strictly greater than 10, preferably greater than 20 and at most equal to 2000.

Examples of thixotropic agents that may be mentioned include:
mineral thickeners, boric acid and borates, titanates, aluminates, zirconates;
compounds bearing hydroxyl groups;
compounds based on polyethylene and/or polypropylene;
compounds comprising cyclic amine functions;
compounds of polyether type or comprising polyether groups, and
fluoro resins, preferably based on polyfluoroethylene (PFE) and even more preferentially based on polytetrafluoroethylene (PTFE or Teflon®).

Another subject of the invention relates to an elastomer obtained by crosslinking, in the presence of water provided by the ambient air or by prior addition of water, of the polyorganosiloxane composition X according to the invention and as defined above.

Another subject of the invention relates to the use of the polyorganosiloxane composition X according to the invention and as defined above or of the elastomer according to the invention and as defined above for preparing silicone leakproofing seals which have good resistance to aging in fluids used in a powertrain.

Finally, the last subject according to the invention relates to a process for sealing and assembling at least one component of a powertrain, comprising steps a) to d) below:

a) a polyorganosiloxane composition X according to the invention and as defined above is prepared, b) said polyorganosiloxane composition X is applied to at least one zone of contact of said component continuously or discontinuously and optionally in the form of a bead, c) said polyorganosiloxane composition X is left to crosslink into silicone elastomer in the presence of moisture provided by the ambient air or by prior addition of water so as to form a leakproofing seal, and d) said component is assembled with another component of the powertrain so that the seal formed ensures the assembly and leakproofing between the two components of the powertrain.

In the motor vehicle sector, silicone elastomers are often used in the form of silicone seals. The term "silicone seals" includes several types of leakproofing seals, namely "flowed" seals (FS), also known as squashed seals, and form-fill seals (FFS), also known as "shaped seals".

"Flowed" seals (FS) are generally formed following the application of a pasty bead of the compositions to the zone of contact between two metal or plastic elements to be assembled. The pasty bead is first deposited on one of the elements and the other element is then applied onto the first; this results in squashing of the bead before it is converted into elastomer. Seals of this type are aimed at assemblages which do not have to be dismantled in common practice (oil sump seals, timing case seals, etc.).

"Form-fill" seals (FFS) are used in particular in the transport and motor vehicle sector, for leakproofing applications on all engine parts that need to be able to be dismantled, for instance the cylinder head cover, the oil pump, the water pump, the radiator tank, the oil sump, the timing case cover or the clutch release sleeve. "Form-fill" seals (FFS) are generally formed following the application of a pasty bead of the compositions to the zone of contact between two elements to be assembled. However, after the deposition of the pasty bead onto one of the elements, the bead is given time to crosslink into elastomer and the second element is then applied onto the first. As a result, such an assemblage can be readily dismantled since the element which is applied onto the one that received the seal does not adhere to this seal. Moreover, by virtue of its elastomeric nature, the seal espouses the irregularities of the surfaces to be sealed together, and as such it is unnecessary to carefully machine the surfaces that are to be placed in contact with each other and to force-tighten the assemblages obtained. These distinguishing features make it possible, to a certain extent, to dispense with fastening seals, spacers or ribs usually intended to stiffen and reinforce the elements of the assemblages. A "form-fill" seal is generally a closed bead of silicone elastomer of ovoid cross section that is deposited in a well-defined outline and whose function is to render leakproof two (or more) dismantable parts.

As the compositions used in the process according to the invention cure rapidly at room temperature and even in an enclosed environment, the result of this is that the silicone leakproofing seals resulting from the curing of these compositions may be prepared under very rigorous industrial manufacturing conditions. For example, they may be manufactured on the normal assembly lines of the motor vehicle industry equipped with an automatic device for the deposition of the compositions. This automatic device very often has a mixing head and a depositing nozzle, the latter moving along according to the outline of the seals to be manufactured. The compositions manufactured and distributed by means of this device preferably have a curing time that is properly adjusted in order, on the one hand, to avoid the compositions from setting solid in the mixing head and, on the other hand, to obtain complete crosslinking after the end of deposition of the pasty bead onto the parts to be sealed together. These "shaped" seals are more especially suitable for cylinder head cover seals, gearbox case cover seals, timing spacer seals and even oil sump seals.

The component may be of diverse and varied nature and is made of glass, plastic, metal, etc.

According to another particular embodiment of the process according to the invention, the powertrain component is chosen from the group consisting of: a cylinder head, an oil sump, a cylinder head cover, a timing case cover, a main bearing bar, an engine cylinder block, a gear box, a water pump, a positive crankcase ventilation box, a water filter, an oil filter, an oil pump, a box comprising electronic components of a powertrain or a clutch guide.

In general, the silicone composition is applied to the component either in the form of a continuous or discontinuous seal, or in the form of a continuous or discontinuous layer. To form a continuous or discontinuous layer, the standard deposition or coating techniques may be used.

After the deposition of the compositions as they are, onto solid substrates, in a humid atmosphere, it is observed that a process of curing into elastomer occurs, taking place from the outside to the inside of the mass deposited. A skin forms first at the surface, then the crosslinking continues in depth. The complete formation of the skin, which results in a tack-free feel of the surface, requires a period of time of a few minutes; this period of time depends on the degree of relative humidity of the atmosphere surrounding the compositions and on the crosslinkability of the latter.

One-pack bases are described in detail, for example, in patents EP 141 685, EP 147 323, EP 102 268, EP 21 859, FR 2 121 289 and FR 2 121 631, cited as reference.

Other advantages and features of the present invention will appear on reading the following examples that are given by way of illustration and that are in no way limiting.

EXAMPLES

I) Preparation of the Formulations
Products Used
αω OH PDMS: α,ω-dihydroxylated polydimethylsiloxane containing 0.045% by weight of hydroxyl groups OH
PDMS: Polydimethysiloxane containing chain-end trimethylsilyl functions, with a viscosity of 100 mPa·s
Silanes:
Dynasylan VTMO: Vinyltrimethoxysilane (VTMO) $(CH_2=CH_2)Si(OCH_3)_3$ (supplier Evonik)
Dynasylan 6490: Vinyltrimethoxysilane (VTMO) partially hydrolyzed and condensed (supplier Evonik)
Functionalization Catalyst:
Lithium hydroxide: lithium hydroxide monohydrate ($LiOH.H_2O$—3.8% by weight) dissolved in methanol
Condensation Catalyst:
Cy2G: DicyclohexylMethylButylguanidine (supplier BSI)
Adhesion Promotors:
Dynasylan DAMO-T (Evonik): N-(2-Aminoethyl)-3-aminopropyltrimethoxysilane (purity>90%)
Dynasylan DAMO (Evonik): N-(2-Aminoethyl)-3-aminopropyltrimethoxysilane (purity>99%)
Dynasylan GLYMO (Evonik): gamma-glycidoxypropyltrimethoxysilane
Dynasylan DS1146 (Evonik): alkylpolysiloxane, aminoalkyl groups modified
Silquest A-link597 (Momentive): Tris-(3-(trimethoxysilyl)propyl) isocyanurate
Fillers:
Winnofil SPM: stearate-treated calcium carbonate (supplier Solvay)
Omya BLR3: calcium carbonate surface-treated with a stearate (supplier Omya)
Martinal OL107A: Silane-treated aluminum trihydroxide D50 1.1-1.7 μm (supplier Albermale)
Martinal OL107ZO: Silane-treated aluminum trihydroxide D50 1.6-1.9 μm (supplier Albermale)
Black Y200: Acetylene black, apparent density 200 kg/m$^3$ (supplier SN2A)
Black Y70: Acetylene black, apparent density 70 kg/m$^3$ (supplier SN2A)
Products Prepared
Synthesis of 1-butyl-2,3-dicyclohexyl-1-methylguanidine (Cy2G)

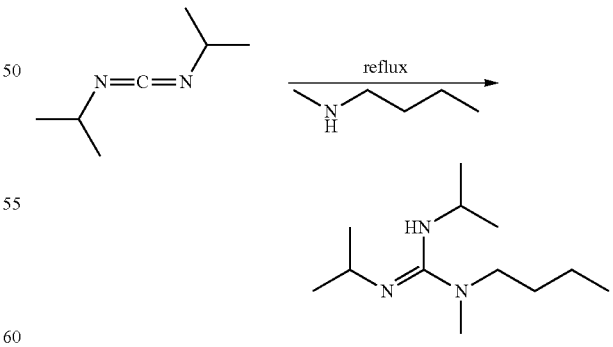

A mixture of 32.68 g of N-butyl-N-methylamine (0.375 mol) and 23.66 g of diisopropylcarbodiimide (0.1875 mol) is refluxed for 3 hours. Analysis by GC then shows a conversion of greater than 99.5% of the diisopropylcarbodiimide. The final colorless mixture is concentrated at 60° C. under 5 mbar for 2 hours to give 40 g of a colorless and virtually odorless low-viscosity liquid corresponding to the expected guanidine (100% yield).

$^1$H NMR/CDCl$_3$ (ppm): 0.88 (3 H, t), 1.06 (12 H, d), 1.26 (2 H, sext.), 1.46 (2 H, quint), 2.67 (3 H, s), 3.05 (2 H, t), 3.35 (2 H, m).

Comparative Example C1

With Calcium Carbonate and without Aluminum Hydroxide 626 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 96 g of acetylene black Y70 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 0.6 g of a functionalization catalyst based on lithium hydroxide monohydrate dissolved in methanol is added. This is followed by a homogenization phase of 4 minutes at 400 rpm. 300 g of calcium carbonate BLR3 (from the company Omya) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 6 g of N-(2-aminoethyl)-3-aminopropyltrimethoxysilane (Dynasylan DAMO, Evonik) are added with stirring at 200 rpm, followed by addition of 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Comparative Example C2

With Calcium Carbonate and Siloxane which is a Condensate Obtained by Partial Hydrolysis and Condensation of a Polyalkoxylated Silane as Described in WO 2011/114 021

602 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 96 g of acetylene black Y70 (from the company SN2A) and 24 g of vinyltrimethoxysilane (Dynasylan VTMO, Evonik) are placed in a planetary mixer. This mixture is homogenized by rotating the butterfly paddle at 200 rpm for 2 minutes. Next, 0.6 g of a functionalization catalyst based on lithium hydroxide monohydrate dissolved in methanol is added. This is followed by a homogenization phase of 4 minutes at 400 rpm. 300 g of calcium carbonate BLR3 (from the company Omya) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 6 g of N-(2-aminoethyl)-3-aminopropyltrimethoxysilane (Dynasylan DAMO, Evonik) are added with stirring at 200 rpm, followed by addition of 48 g of Dynasylan 6490 (Evonik) and 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Comparative Example C3

With Calcium Carbonate and Siloxane which is a Condensate Obtained by Partial Hydrolysis and Condensation of a Polyalkoxylated Silane as Described in WO 2011/114 021

602 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 96 g of acetylene black Y200 (from the company SN2A) and 24 g of vinyltrimethoxysilane (Dynasylan VTMO, Evonik) are placed in a planetary mixer. This mixture is homogenized by rotating the butterfly paddle at 200 rpm for 2 minutes. Next, 0.6 g of a functionalization catalyst based on lithium hydroxide monohydrate dissolved in methanol is added. This is followed by a homogenization phase of 4 minutes at 400 rpm. 300 g of calcium carbonate BLR3 (from the company Omya) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 6 g of N-(2-aminoethyl)-3-aminopropyltrimethoxysilane (Dynasylan DAMO, Evonik) are added with stirring at 200 rpm, followed by addition of 48 g of Dynasylan 6490 (Evonik) and 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Comparative Example C4

With Aluminum Hydroxide and Siloxane which is a Condensate Obtained by Partial Hydrolysis and Condensation of a Polyalkoxylated Silane 721 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 96 g of acetylene black Y200 (from the company SN2A) and 24 g of vinyltrimethoxysilane (Dynasylan VTMO, Evonik) are placed in a planetary mixer. This mixture is homogenized by rotating the butterfly paddle at 200 rpm for 2 minutes. Next, 1.8 g of a functionalization catalyst based on lithium hydroxide monohydrate dissolved in methanol are added. This is followed by a homogenization phase of 4 minutes at 400 rpm. 180 g of Martinal OL107A (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 6 g of N-(2-aminoethyl)-3-aminopropyltrimethoxysilane (Dynasylan DAMO-T, Evonik) are added with stirring at 200 rpm, followed by addition of 48 g of Dynasylan 6490 (Evonik) and 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Comparative Example C5

With Aluminum Hydroxide and Non-Amino Adhesion Promoter 738 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 96 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 2.4 g of a functionalization catalyst based on lithium hydroxide monohydrate dissolved in methanol are added. This is followed by a homogenization phase of 4 minutes at 400 rpm. 180 g of Martinal OL107A (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 12 g of tris-(3-(trimethoxysilyl)propyl) isocyanurate (A-Link597, Momentive) are added with stirring at 200 rpm, followed by addition of 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Comparative Example C6

With Aluminum Hydroxide and Non-Amino Adhesion Promoter 654 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 120 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 2.4 g of a functionalization catalyst based on lithium hydroxide monohydrate dissolved in methanol are added. This is followed by a homogenization phase of 4 minutes at 400 rpm. 240 g of precipitated calcium carbonate Winnofil SPM (from the company Solvay) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 12 g of gamma-glycidoxypropyltrimethoxysilane (Dynasylan GLYMO, Evonik) are added with stirring at 200 rpm, followed by addition of 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Example E1 According to the Invention

With Aluminum Hydroxide and Amino Silane (without Calcium Carbonate and without Siloxane which is a Condensate Obtained by Partial Hydrolysis and Condensation of a Polyalkoxylated Silane)

745 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 96 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 1.2 g of a functionalization catalyst based on lithium hydroxide monohydrate dissolved in methanol are added. This is followed by a homogenization phase of 4 minutes at 400 rpm. 180 g of Martinal OL107A (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 6 g of N-(2-aminoethyl)-3-aminopropyltrimethoxysilane (Dynasylan DAMO-T, Evonik) are added with stirring at 200 rpm, followed by addition of 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Example E2 According to the Invention

With Aluminum Hydroxide and Amino Silane (without Calcium Carbonate and without Siloxane which is a Condensate Obtained by Partial Hydrolysis and Condensation of a Polyalkoxylated Silane)

720 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 120 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 2.4 g of a functionalization catalyst based on lithium hydroxide monohydrate dissolved in methanol are added. This is followed by a homogenization phase of 4 minutes at 400 rpm. 180 g of Martinal OL107A (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 6 g of N-(2-aminoethyl)-3-aminopropyltrimethoxysilane (Dynasylan DAMO-T, Evonik) are added with stirring at 200 rpm, followed by addition of 3.6 g of 1-butyl-2,3-dicyclohexyl-1-methylguanidine.

The medium is stirred at 400 rpm for 5 minutes and is then degassed under a partial vacuum of 40 mbar at 300 rpm for 5 minutes. Finally, the mixture is transferred into closed plastic cartridges.

Example E3 According to the Invention

With Aluminum Hydroxide and Amino Silane (without Calcium Carbonate and without Siloxane which is a Condensate Obtained by Partial Hydrolysis and Condensation of a Polyalkoxylated Silane)

714 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 120 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 2.4 g of a functionalization catalyst based on lithium hydroxide monohydrate dissolved in methanol are added. This is followed by a homogenization phase of 4 minutes at 400 rpm. 180 g of Martinal OL107A (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 12 g of N-(2-aminoethyl)-3-aminopropyltrimethoxysilane (Dynasylan DAMO-T, Evonik) are added with stirring at 200 rpm, followed by addition of 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Example E4 According to the Invention

With Aluminum Hydroxide and Amino Silane (without Calcium Carbonate and without Siloxane which is a Condensate Obtained by Partial Hydrolysis and Condensation of a Polyalkoxylated Silane)

708 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 120 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 2.4 g of a functionalization catalyst based on lithium hydroxide monohydrate dissolved in methanol are added. This is followed by a homogenization phase of 4 minutes at 400 rpm. 180 g of Martinal OL107A (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 18 g of N-(2-aminoethyl)-3-aminopropyltrimethoxysilane (Dynasylan DAMO-T, Evonik) are added with stirring at 200 rpm, followed by addition of 3.6 g of 1-butyl-2,3-dicyclohexyl-1-methylguanidine.

The medium is stirred at 400 rpm for 5 minutes and is then degassed under a partial vacuum of 40 mbar at 300 rpm for 5 minutes. Finally, the mixture is transferred into closed plastic cartridges.

Example E5 According to the Invention

With Aluminum Hydroxide and Amino Silane (without Calcium Carbonate and without Siloxane which is a Condensate Obtained by Partial Hydrolysis and Condensation of a Polyalkoxylated Silane)

708 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 120 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 2.4 g of a functionalization catalyst based on lithium hydroxide monohydrate dissolved in methanol are added. This is followed by a homogenization phase of 4 minutes at 400 rpm. 180 g of Martinal OL107ZO (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 18 g of N-(2-aminoethyl)-3-aminopropyltrimethoxysilane (Dynasylan DAMO-T, Evonik) are added with stirring at 200 rpm, followed by addition of 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

Example E6 According to the Invention

With Aluminum Hydroxide and Amino Silane (without Calcium Carbonate and without Siloxane which is a Condensate Obtained by Partial Hydrolysis and Condensation of a Polyalkoxylated Silane)

714 g of α,ω-dihydroxylated polydimethylsiloxane oil containing 0.045% by weight of hydroxyl groups OH, 120 g of a polydimethylsiloxane containing chain-end trimethylsilyl functions, with a viscosity of 100 mPa·s, 120 g of acetylene black Y200 (from the company SN2A) and 48 g of vinyltrimethoxysilane (Dynasylan VTMO, Evonik) are placed in a planetary mixer. This mixture is homogenized by rotating the butterfly paddle at 200 rpm for 2 minutes. Next, 2.4 g of a functionalization catalyst based on lithium hydroxide monohydrate dissolved in methanol are added. This is followed by a homogenization phase of 4 minutes at 400 rpm. 180 g of Martinal OL107A (from the company Albermale) are then incorporated at a stirring speed of 200 rpm and dispersed for a further 4 minutes at 400 rpm. The medium is then degassed under a partial vacuum of 50 mbar for 10 minutes. The mixture is then placed under nitrogen and 12 g of Dynasylan 1146 (Evonik) are added with stirring at 200 rpm, followed by addition of 3.6 g of 1-butyl-2,3-dicyclohexyl-1-methylguanidine (Cy2G).

The medium is stirred at 400 rpm for 5 minutes and is then degassed under a partial vacuum of 40 mbar at 300 rpm for 5 minutes. Finally, the mixture is transferred into closed plastic cartridges.

II) Characterization of the Products a) Mechanical Properties

A seal in the form of a film 2 mm thick is then prepared with each of the formulations and left to crosslink for 7 days under controlled conditions (23° C.±2° C. and 50%±5% humidity).

The Shore A hardness (SAH) expressed as Shore A (ShA) is measured according to the indications of standard ASTM-D2240 or DIN 53505 and the mechanical tensile properties ((breaking strength (noted as R/r expressed in MPa), the elongations at break (noted as A/r expressed in %) and the modulus at 100% elongation (noted as M100% expressed in MPa)) are measured according to the indications of standard ASTM-D412 or AFNOR-T-46002. These measurements are performed using specimens 2 mm thick after 14 days of crosslinking.

b) Properties of Resistance to Ermine Oils

Seals in the form of films 2 mm thick are precrosslinked in a room conditioned at 23° C. and at 50% hygrometry for 14 days. In each case, 3 square-shaped specimens cut out of the seals, and whose Shore A hardness was measured beforehand (by superposition of the three squares), are placed in a 150 ml glass flask filled with 5W30 diesel oil (distributed by the company Total). After heating at 150° C. for 3 days and cooling to room temperature, the specimens are wiped with an absorbent tissue and the Shore A hardness is measured using a Zwick durometer. The residual hardness (noted as SAH res), expressed in %, is equal to the SAH ratio before and after immersion in oil. The higher this ratio, the better the resistance to the oil.

c) Adherence Properties

A parallelepipedal-shaped silicone elastomer seal 1 mm thick is applied between two sterigmas. The specimen thus obtained, after 14 days of crosslinking at 23° C.±2° C. and 50%±5% relative humidity is subjected to a tensile shear stress.

The bonding is characterized by the breaking strength (MPa) and the type of rupture (percentage of cohesive rupture, noted as % CR). A high cohesive rupture is sought (target 100%).

Aluminum specimens of AG3 grade are scraped beforehand so as to remove the oxide layer and are then cleaned with solvent and dried.

For the tests of adhesion to a surface polluted with oil, the specimens are dipped in a mixture of heptane and Elf Diesel 5W30 oil (95/5) and then drained before being placed on the silicone elastomer seal.

III) Results

TABLE 1

| Composition (expressed in weight %) | Comparative examples | | | | | |
|---|---|---|---|---|---|---|
| | Comparative example C1 | Comparative example (according to WO 2011/114021) C2 | Comparative example (according to WO 2011/114021) C3 | Comparative example C4 | Comparative example C5 | Comparative example C6 |
| PDMS αω OH (A') | 52.15 | 50.15 | 50.15 | 60.05 | 61.5 | 54.5 |
| PDMS (H) | 10 | 10 | 10 | 10 | 10 | 10 |
| Dynasylan VTMO (B) | 4 | 2 | 2 | 2 | 4 | 4 |
| Lithium hydroxide (C) | 0.05 | 0.05 | 0.05 | 0.15 | 0.2 | 0.2 |
| Black Y70 (D) | 8 | 8 | | | | |
| Black Y200 (D) | | | 8 | 8 | 8 | 10 |
| Omya BLR3 | 25 | 25 | 25 | | | |
| Winnofil SPM | | | | | | 20 |
| Martinal OL107A (E) | | | | 15 | 15 | |
| Martinal OL107ZO (E) | | | | | | |
| Dynasylan DAMO (F) | 0.5 | 0.5 | 0.5 | | | |
| Dynasylan DAMO-T (F) | | | | 0.5 | | |
| Dynasylan DS1146 (F) | | | | | | |
| Silquest Alink 597 | | | | | 1 | |
| Dynasylan GLYMO | | | | | | 1 |
| Dynasylan DS6490 | | 4 | 4 | 4 | | |
| Cy2G (G) | 0.3 | 0.3 | 0.3 | 0.3 | 0.3 | 0.3 |
| Mechanical properties after 14 days of crosslinking at 23° C. and 50% RH | | | | | | |
| SAH (ShA) | 33 | 45 | 40 | 36 | 33 | 38 |
| R/r (MPa) | 2.3 | 2.2 | 1.9 | 2.29 | 2.66 | 3.48 |
| A/r (%) | 422 | 285 | 302 | 280 | 455 | 743 |
| M100% (MPa) | 0.71 | 1.16 | 0.95 | 0.92 | 0.78 | 0.84 |
| Mechanical properties after treatment in Elf Diesel Evolution 5W30 oil at 150° C. for 3 days | | | | | | |
| SAH (ShA) (SAH res(%)) | 8 (24%) | 25 (56%) | 21 (53%) | 20 (56%) | 26 (79%) | 21 (55%) |
| R/r (MPa) | 1 | 1.3 | 1.36 | 1.9 | 3 | 2.9 |
| A/r (%) | 460 | 475 | 397 | 425 | 448 | 550 |
| M100% (MPa) | 0.33 | 0.52 | 0.54 | 0.49 | 0.72 | 0.65 |
| Adhesion properties in tensile shear for 1 mm bonding after 14 days of crosslinking (breaking strength in MPa - % RC) | | | | | | |
| Alu AG3 | 1.0 (100%) | 1.2 (90%) | 1.0 (95%) | 1.0 (90%) | 0.9 (90%) | 1.1 (93%) |
| Polluted Alu AG3 | 0.9 (30%) | 1.0 (85%) | 1.2 (95%) | 0.8 (55%) | 0.7 (20%) | 1.0 (60%) |
| Adhesion properties after 4 months of storage in a cartridge at room temperature (breaking strength in MPa - % RC) | | | | | | |
| Alu AG3 | 1.1 (100%) | 1.3 (90%) | 1.3 (95%) | 1.2 (90%) | 1.1 (95%) | Not measured |
| Polluted Alu AG3 | 1.0 (40%) | 0.8 (10%) | 0.6 (0%) | 0.6 (0%) | 0.2 (0%) | 0.9 (48) |

TABLE 1-continued

Comparative examples

| Composition (expressed in weight %) | Comparative example C1 | Comparative example (according to WO 2011/114021) C2 | Comparative example (according to WO 2011/114021) C3 | Comparative example C4 | Comparative example C5 | Comparative example C6 |
|---|---|---|---|---|---|---|
| Adhesion properties after 6 months of storage in a cartridge at room temperature (breaking strength in MPa - % RC) | | | | | | |
| Alu AG3 | Not measured | Not measured | Not measured | Not measured | Not measured | 1.1 (100%) |
| Polluted Alu AG3 | Not measured | Not measured | Not measured | Not measured | Not measured | 0.7 (10%) |

TABLE 2

Examples according to the invention

| Composition (expressed in weight %) | Example according to the invention E1 | Example according to the invention E2 | Example according to the invention E3 | Example according to the invention E4 | Example according to the invention E5 | Example according to the invention E6 |
|---|---|---|---|---|---|---|
| PDMS αω OH (A') | 62 | 60 | 59.5 | 59 | 59 | 59.5 |
| PDMS (H) | 10 | 10 | 10 | 10 | 10 | 10 |
| Dynasylan VTMO (B) | 4 | 4 | 4 | 4 | 4 | 4 |
| Lithium hydroxide (C) | 0.2 | 0.2 | 0.2 | 0.2 | 0.2 | 0.2 |
| Black Y70 (D) | | | | | | |
| Black Y200 (D) | 8 | 10 | 10 | 10 | 10 | 10 |
| Omya BLR3 | | | | | | |
| Winnofil SPM | | | | | | |
| Martinal OL107A (E) | 15 | 15 | 15 | 15 | | 15 |
| Martinal OL107ZO (E) | | | | | 15 | |
| Dynasylan DAMO (F) | | | | | | |
| Dynasylan DAMO-T (F) | 0.5 | 0.5 | 1 | 1.5 | 1.5 | |
| Dynasylan DS1146 (F) | | | | | | 1 |
| Silquest Alink 597 | | | | | | |
| Dynasylan GLYMO | | | | | | |
| Dynasylan DS6490 | | | | | | |
| Cy2G (G) | 0.3 | 0.3 | 0.3 | 0.3 | 0.3 | 0.3 |
| Mechanical properties after 14 days of crosslinking at 23° C. and 50% RH | | | | | | |
| SAH (ShA) | 35 | 36 | 39 | 38 | 39 | 39 |
| R/r (MPa) | 3.1 | 3.7 | 3.1 | 3.5 | 3.2 | 3.5 |
| A/r (%) | 502 | 545 | 440 | 484 | 436 | 480 |
| M100% (MPa) | 0.75 | 0.88 | 0.88 | 0.97 | 0.89 | 0.96 |
| Mechanical properties after treatment in Elf Diesel Evolution 5W30 oil at 150° C. for 3 days | | | | | | |
| SAH (ShA) (SAH res(%)) | 17 (50%) | 16 (44%) | 16 (41%) | 17 (45%) | 17 (44%) | 18 (46%) |
| R/r (MPa) | 1.6 | 1.5 | 1.6 | 2 | 1.6 | 1.8 |
| A/r (%) | 481 | 741 | 617 | 763 | 758 | 486 |
| M100% (MPa) | 0.4 | 0.26 | 0.32 | 0.38 | 0.37 | 0.42 |
| Adhesion properties in tensile shear for 1 mm bonding after 14 days of crosslinking (breaking strength in MPa - % RC) | | | | | | |
| Alu AG3 | 1.3 (92%) | 1.3 (85%) | 2.0 (100%) | 1.8 (87%) | 1.5 (100%) | 1.0 (95%) |
| Polluted Alu AG3 | 1.25 (82%) | | 1.7 (65%) | 1.6 (97%) | 1.5 (83%) | 1.3 (70%) |
| Adhesion properties after 4 months of storage in a cartridge at room temperature (breaking strength in MPa - % RC) | | | | | | |
| Polluted Alu AG3 | 1.1 (100) | 1.2 (95%) | 1.2 (92%) | 1.0 (80%) | Not measured | Not measured |
| Adhesion properties after 6 months of storage in a cartridge at room temperature (breaking strength in MPa - % RC) | | | | | | |
| Polluted Alu AG3 | Not measured | 1.2 (73%) | 1.3 (93%) | 1.3 (70%) | Not measured | 1.0 (94%) |
| Adhesion properties after 9 months of storage in a cartridge at room temperature (breaking strength in MPa - % RC) | | | | | | |
| Alu AG3 | Not measured | Not measured | Not measured | Not measured | 1.2 (100%) | Not measured |
| Polluted Alu AG3 | Not measured | Not measured | Not measured | Not measured | 1.2 (98%) | Not measured |

Comparative Examples C1 to C3 show that the properties of adhesion to a surface polluted with motor oil of the formulations containing calcium carbonate without and with siloxane which is a condensate obtained by partial hydrolysis and condensation of a polyalkoxylated silane are significantly degraded after 4 months of storage at room temperature in a closed cartridge, irrespective of the grade of acetylene black used (Y70 or Y200).

On the other hand, the examples according to the invention E1 to E6, namely combining acetylene black, surface-treated aluminum hydroxide and an amino silane, make it possible to conserve, after 6 months of storage, good properties of adhesion to a polluted surface.

Replacing the calcium carbonate with aluminum hydroxide (OL107A) makes it possible significantly to improve the mechanical properties of the elastomer before and after treatment in the motor oil, but also the properties of adhesion to a surface polluted with oil, which are stable after 9 months of storage (E5).

The properties of adhesion to a surface polluted with motor oil of the examples according to the invention, E1 to E6, are high and stable after a few months of storage, unlike the formulations containing a siloxane which is a condensate obtained by partial hydrolysis and condensation of a polyalkoxylated silane (Comparative Example C4).

The use of an adhesion promoter without an amine function does not make it possible to achieve good properties of adhesion to a polluted surface, even with calcium carbonate in replacement for aluminum hydroxide (Comparative Examples C5 and C6).

The invention claimed is:

1. A polyorganosiloxane composition X that is crosslinkable into elastomer in the presence of moisture provided by ambient air or by prior addition of water, via polycondensation reaction comprising:
   A) at least one polyorganosiloxane A comprising at least one alkoxylated group and comprising identical or different siloxyl units, of formula:

$$(Z)_b(R^4)_a SiO_{[4-(a+b)]/2} \quad (1)$$

in which:
   the symbol $Z = [-(OCH_2CH_2)_c-OR^5]$, with c=0 or 1,
   a=0, 1, 2 or 3; b=0, 1, 2 or 3, a+b=0, 1, 2 or 3,
   the symbol $R^4$ represents a $C_1$ to $C_{13}$ monovalent hydrocarbon-based radical,
   the symbol $R^5$ represents a $C_1$ to $C_6$ monovalent hydrocarbon-based radical or an alkoxyalkyl radical optionally comprising an ester function, and
   with the condition that for at least one siloxyl unit, the index b≥1 such that the polyorganosiloxane A contains at least one alkoxylated group Z,
   B) optionally at least one polyalkoxylated silane B of formula:

$$(R^2)_z Si(OR^3)_{(4-z)} \quad (2)$$

in which:
   z =0 or 1,
   the symbol $R^2$ represents a $C_1$ to $C_{13}$ monovalent hydrocarbon-based radical, and
   the symbols $R^3$, which may be identical or different, each represent a $C_1$ to $C_6$ monovalent hydrocarbon-based radical or an alkoxyalkyl radical optionally containing an ester function,
   C) at least one acetylene black D whose function is to absorb an oil used in a powertrain,
   D) at least one aluminum trihydrate E as mineral filler,
   E) at least one adhesion promoter F bearing at least one amine function,
   F) a catalytically effective amount of at least one guanidine G as condensation catalyst,
   G) optionally at least one unreactive linear polyorganosiloxane H,
   H) optionally at least one filler I, different from E, and
   I) optionally at least one additive J such as a coloring base, a pigment or a thixotropic agent,
   with the additional conditions that
   said polyorganosiloxane composition X contains neither any calcium carbonate nor any siloxane containing from 2 to 10 siloxyl units obtained by partial hydrolysis and condensation of a polyalkoxylated silane, and that
   the polyorganosiloxane A has a number of units strictly greater than 10, optionally greater than 20 and at most equal to 2000.

2. The polyorganosiloxane composition X as claimed in claim 1, comprising:
   A) at least one polyorganosiloxane A comprising at least one alkoxylated group and comprising identical or different siloxyl units, of formula:

$$(Z)_b(R^4)_a SiO_{[4-(a+b)]/2} \quad (1)$$

in which:
   a. the symbol $Z = [-(OCH_2CH_2)_c-OR^5]$, with c=0 or 1,
   b. a=0, 1, 2 or 3; b=0, 1, 2 or 3, a+b=0, 1, 2 or 3,
   c. the symbol $R^4$ represents a $C_1$ to $C_{13}$ monovalent hydrocarbon-based radical,
   d. the symbol $R^5$ represents a $C_1$ to $C_6$ monovalent hydrocarbon-based radical or an alkoxyalkyl radical optionally comprising an ester function, and
   e. with the condition that for at least one siloxyl unit, the index b≥1 such that the polyorganosiloxane A contains at least one alkoxylated group Z,
   B) at least one polyalkoxylated silane B of formula:

$$(R^2)_z Si(OR^3)_{(4-z)} \quad (2)$$

in which:
   z=0 or 1,
   the symbol $R^2$ represents a $C_1$ to $C_{13}$ monovalent hydrocarbon-based radical, and
   the symbols $R^3$, which may be identical or different, each represent a $C_1$ to $C_6$ monovalent hydrocarbon-based radical or an alkoxyalkyl radical optionally containing an ester function,
   C) at least one acetylene black D whose function is to absorb an oil used in a powertrain,
   D) at least one aluminum trihydrate E as mineral filler,
   E) at least one adhesion promoter F bearing at least one amine function,
   F) a catalytically effective amount of at least one guanidine G as condensation catalyst,
   G) optionally at least one unreactive linear polyorganosiloxane H,
   H) optionally at least one filler I, different from E, and
   I) optionally at least one additive J such as a coloring base, a pigment or a thixotropic agent,
   with the additional conditions that
   said polyorganosiloxane composition X contains neither any calcium carbonate nor any siloxane containing from 2 to 10 siloxyl units obtained by partial hydrolysis and condensation of a polyalkoxylated silane, and that
   the polyorganosiloxane A has a number of units strictly greater than 10, optionally greater than 20 and at most equal to 2000.

3. The polyorganosiloxane composition X as claimed in claim 1, in the form of an RTV-1 one-pack composition whose package is airtight.

4. The polyorganosiloxane composition X as claimed in claim 1, in which the crosslinkable polyorganosiloxane A is linear and has the structural formula:

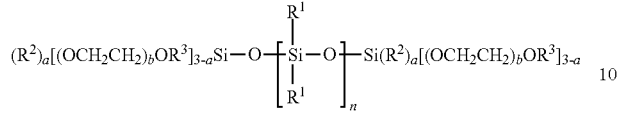

(3)

in which:
the substituents R1, which may be identical or different, each represent a substituted or unsubstituted aliphatic, cyclanic or aromatic $C_1$ to $C_{13}$ saturated or unsaturated monovalent hydrocarbon-based radical;
the substituents R2, which may be identical or different, each represent a substituted or unsubstituted aliphatic, cyclanic or aromatic $C_1$ to $C_{13}$ saturated or unsaturated monovalent hydrocarbon-based radical;
the substituents R3, which may be identical or different, each represent a linear or branched $C_1$ to $C_6$ alkyl radical;
n has a value sufficient to give the polyorganopolysiloxane of formula A a dynamic viscosity at 25° C. ranging from 1000 to 1 000 000 mPa·s; and
the index a is equal to zero or 1 and the index b is equal to zero or 1.

5. The polyorganosiloxane composition X as claimed in claim 1, in which the polyorganosiloxane A comprising at least one alkoxylated group is obtained by reacting, optionally in situ, in the presence of a catalytically effective amount of at least one functionalization catalyst C:
a) at least one polyorganosiloxane A' comprising siloxyl units of formula:

(4)

in which:
x=0, 1, 2 or 3; y=0, 1, 2 or 3, x+y=0, 1, 2 or 3;
the substituents $R^1$, which may be identical or different, each represent a $C_1$ to $C_{30}$ monovalent hydrocarbon-based radical chosen from the group consisting of alkyl, cycloalkyl, aryl; alkaryl and aralkyl radicals, and
at least two siloxyl units comprising a group $\equiv$SiOH are present in the polyorganosiloxane A', preferably at the chain ends, with
b) at least one polyalkoxylated silane B of formula:

(2)

in which:
z =0 or 1,
the symbol $R^2$ represents a $C_1$ to $C_{13}$ monovalent hydrocarbon-based radical, and
the symbols $R^3$, which may be identical or different, each represent a $C_1$ to $C_6$ monovalent hydrocarbon-based radical or an alkoxyalkyl radical optionally containing an ester function.

6. The polyorganosiloxane composition X as claimed in claim 5, in which the functionalization catalyst C is lithium hydroxide or potassium hydroxide.

7. The polyorganosiloxane composition X as claimed in claim 1, in which the condensation catalyst G is a guanidine corresponding to formula (I):

(I)

in which:
the radicals $R^1$, which may be identical or different, represent, independently of each other, a linear or branched monovalent alkyl group, a cycloalkyl group, a (cycloalkyl)alkyl group, the ring being optionally substituted and possibly comprising at least one heteroatom or a fluoroalkyl group,
the radical $R^2$ represents a hydrogen atom, a linear or branched monovalent alkyl group, a cycloalkyl group, an alkyl group substituted with a ring that is optionally substituted and that possibly comprises at least one heteroatom, an aromatic group, an arylalkyl group, a fluoroalkyl group, an alkylamine group or an alkylguanidine group,
the radical $R^3$ represents a linear or branched monovalent alkyl group, a cycloalkyl group, an alkyl group substituted with a ring that is optionally substituted and that possibly comprises at least one heteroatom, an arylalkyl, fluoroalkyl, alkylamine or alkylguanidine group, and
when the radical $R^2$ is not a hydrogen atom, the radicals $R^2$ and $R^3$ may be linked to form a 3-, 4-, 5-, 6- or 7-membered aliphatic ring optionally substituted with one or more substituents.

8. The polyorganosiloxane composition X as claimed in claim 1, in which the condensation catalyst G is a guanidine of formula:

(II)

in which:
the radicals $R^1$, $R^2$, $R^3$, $R^4$ or $R^5$, which may be identical or different, represent, independently of each other, a linear or branched monovalent alkyl group, a cycloalkyl group, a (cycloalkyl)alkyl group, the ring being optionally substituted and possibly comprising at least one heteroatom or a fluoroalkyl group, an aromatic group, an arylalkyl group, a fluoroalkyl group, an alkylamino group or an alkylguanidine group, and
the radicals $R^1$, $R^2$, $R^3$ or $R^4$ may be linked in pairs so as to form a 3-, 4-, 5-, 6- or 7-membered aliphatic ring optionally substituted with one or more substituents.

9. The polyorganosiloxane composition X as claimed in claim 1, in which at least one filler I is present, optionally a kaolin.

10. The polyorganosiloxane composition X as claimed in claim 1, comprising:

A) per 100 parts by weight of at least one polyorganosiloxane A comprising at least one alkoxylated group and comprising identical or different siloxyl units, of formula:

$$(Z)_b(R^4)_a SiO_{[4-(a+b)]/2} \quad (1)$$

in which:
the symbol $Z = [-(OCH_2CH_2)_c-OR^5]$, with c=0 or 1, a=0, 1, 2 or 3; b=0, 1, 2 or 3, a+b=0, 1, 2 or 3,
the symbol $R^4$ represents a $C_1$ to $C_{13}$ monovalent hydrocarbon-based radical,
the symbol $R^5$ represents a $C_1$ to $C_6$ monovalent hydrocarbon-based radical or an alkoxyalkyl radical optionally comprising an ester function, and
with the condition that for at least one siloxyl unit, the index b is ≥1 such that the polyorganosiloxane A contains at least one alkoxylated group Z, B) from 0 to 50 parts by weight of at least one polyalkoxylated silane B of formula $$(R^2)_z Si(OR^3)_{(4-z)} \quad (2)$$

in which:
z = 0 or 1,
the symbol $R^2$ represents a $C_1$ to $C_{13}$ monovalent hydrocarbon-based radical, and
the symbols $R^3$, which may be identical or different, each represent a $C_1$ to $C_6$ monovalent hydrocarbon-based radical or an alkoxyalkyl radical optionally containing an ester function, C) from 0.1 to 50 parts by weight of at least one acetylene black D whose function is to absorb an oil used in a powertrain, D) from 0.1 to 50 parts by weight of at least one aluminum trihydrate E as mineral filler, E) from 0.1 to 60 parts by weight of at least one adhesion promoter F bearing at least one amine function, F) from 0.01 to 50 parts by weight of at least one guanidine G as condensation catalyst, G) from 0 to 60 parts by weight of at least one nonreactive linear polyorganosiloxane H, H) from 0 to 250 parts by weight of at least one filler I, different from E, and I) from 0 to 20 parts by weight of at least one additive J optionally comprising a coloring base, a pigment or a thixotropic agent, with the additional conditions that
said polyorganosiloxane composition X contains neither any calcium carbonate nor any siloxane containing from 2 to 10 siloxyl units obtained by partial hydrolysis and condensation of a polyalkoxylated silane, and that
the polyorganosiloxane A has a number of units strictly greater than 10, optionally greater than 20 and at most equal to 2000.

11. An elastomer obtained by crosslinking, in the presence of moisture provided by ambient air or by prior addition of water, of the polyorganosiloxane composition X as defined according to claim 1.

12. A polyorganosiloxane composition X as defined according to claim 1, capable of being used for preparing one or more silicone leakproofing seals which have good resistance to aging in one or more fluids used in a powertrain.

13. A process for sealing and assembling at least one component of a powertrain, comprising:
a) preparing a polyorganosiloxane composition X as defined according to claim 1,
b) said polyorganosiloxane composition X is applied to at least one zone of contact of said component continuously or discontinuously and optionally in the form of a bead,
c) said polyorganosiloxane composition X is left to crosslink into silicone elastomer in the presence of moisture provided by ambient air or by prior addition of water so as to form a leakproofing seal, and
d) said component is assembled with another component of the powertrain so that the seal formed ensures assembly and leakproofing between the two components of the powertrain.

* * * * *